April 12, 1960
B. J. ECKERT ET AL
2,932,156
TURBINE OPERABLE BY THE EXHAUST GASES OF
AN INTERNAL COMBUSTION ENGINE
Filed Feb. 7, 1956
2 Sheets-Sheet 2
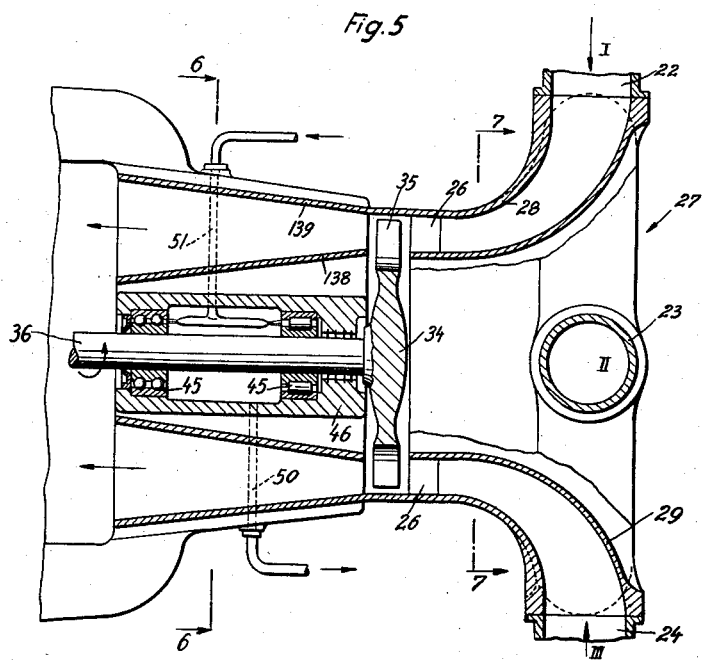
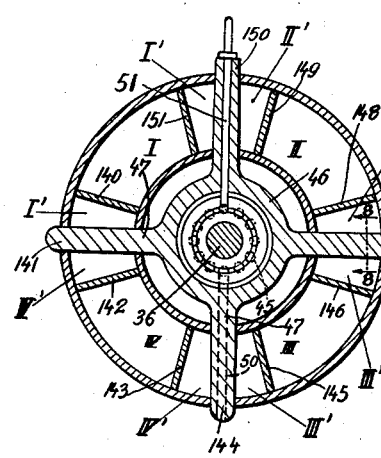
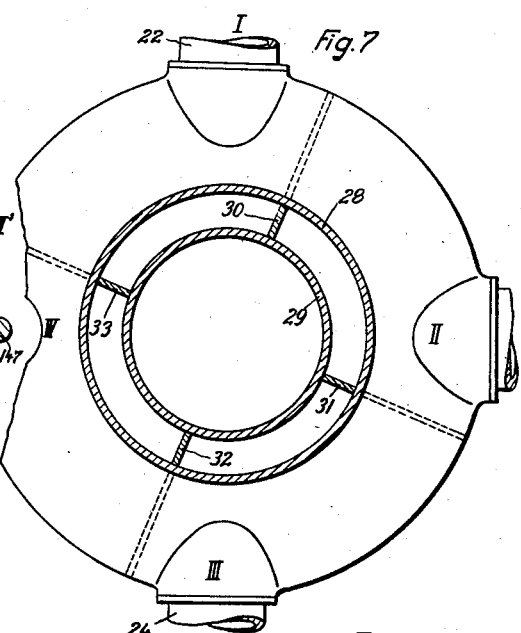
Inventors
BRUNO ECKERT
AND HEINRICH KÜHL
BY Dicke and Reig
ATTORNEYS.

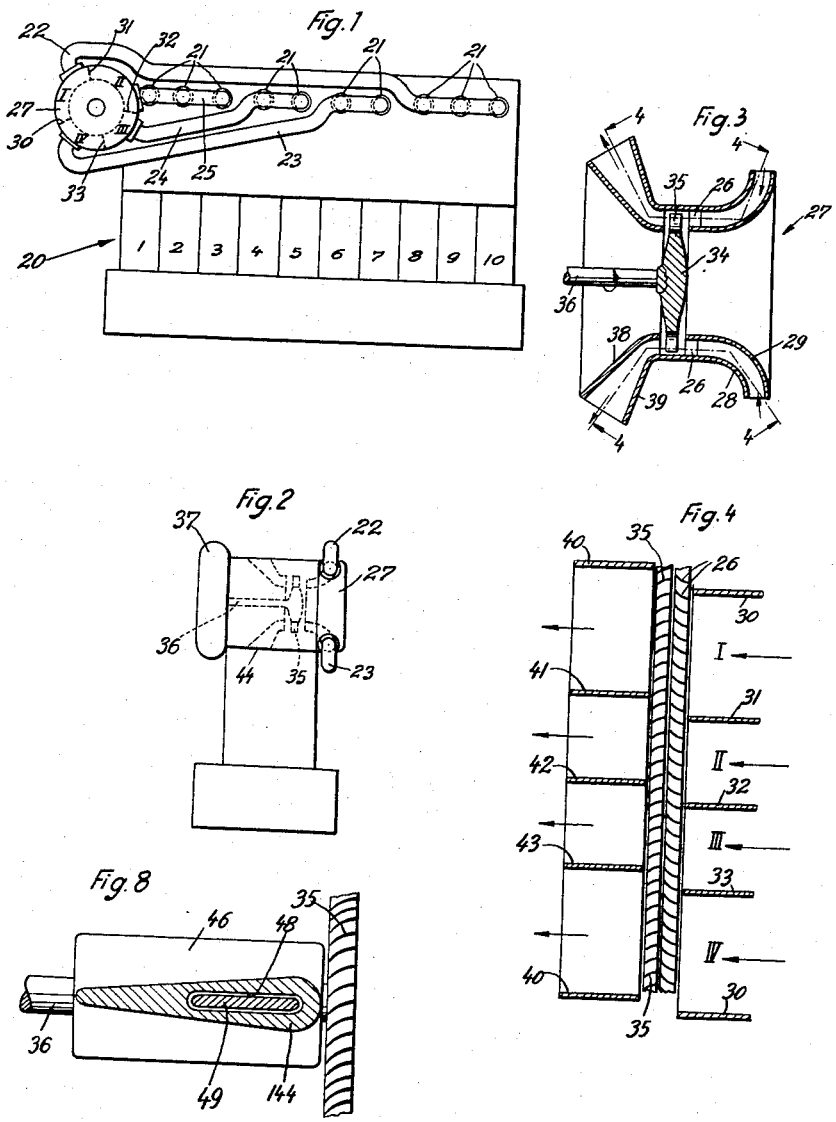

United States Patent Office 2,932,156
Patented Apr. 12, 1960

2,932,156

TURBINE OPERABLE BY THE EXHAUST GASES OF AN INTERNAL COMBUSTION ENGINE

Bruno Josef Eckert, Stuttgart-Bad Cannstatt, and Heinrich Kühl, Stuttgart, Germany, assignors to Daimler-Benz Aktiengesellschaft, Stuttgart-Unterturkheim, Germany Application February 7, 1956, Serial No. 564,074

Claims priority, application Germany February 9, 1955

7 Claims. (Cl. 60—13)

Our invention relates to a turbine operable by the exhaust gases of an internal combustion engine. More particularly, it relates to a turbine in which separate gas admission ducts are connected to different cylinders or cylinder groups of the engine for the purpose of conducting separate streams of exhaust gases to the turbine wheel, the gas admission port coordinated to the turbine wheel being subdivided into a plurality of segmental outlets, each outlet being connected with a cylinder or a group of cylinders of the engine. It has been found that such subdivision of the gas supply means connecting the engine cylinders with the turbine contributes to an efficient utilization of the energy of the exhaust gases by the elimination of an undesirable reaction of the gas stream issuing from one cylinder or group of cylinders upon the gas stream issuing from another cylinder or group of cylinders.

Expressed in other terms, our invention relates to exhaust gas turbines for multi-cylinder internal combustion engines in which for the best possible utilization of the pressure fluctuations occurring in the exhaust ducts and for the purpose of eliminating undesirable reactions of its exhaust gas streams upon each other and thus upon the alternating charging operation of the different cylinders, the exhaust ducts of individual cylinders or groups of cylinders extend separately to the turbine, the exhaust gas supply to the turbine wheel being subdivided into a plurality of segmental ports coordinated to a plurality of separate cylinders or groups of cylinders.

It is common practice in the design of turbines to provide a diffusor behind the last turbine step to thereby recover the major portion of the exhaust energy. Such provision, however, is of but little efficiency where a diffusor of conventional design is added to the last step of the turbine of the above described design because the pressures prevailing in the different segments of the turbine and the consequent speeds of the gas streams issuing therefrom are locally different and fluctuate in different manners. Such differences result in cross currents. Mainly for this reason a diffusor of conventional design permits to recover such energy of flow only as corresponds to the smallest local outlet speeds occurring at any segment.

It is the object of our invention to eliminate such disadvantage and to provide an improved exhaust gas turbine in which the energy of the gases issuing from the turbine wheel may be utilized in a superior manner.

More particularly, it is an object of our invention to provide the turbine with improved diffusor means whereby a mutual interference in such diffusor means of the gas streams stemming from different cylinders or groups of cylinders is prevented so that a larger proportion of the energy of the gas stream issuing from the turbine vanes may be recovered.

Further objects of our invention are to provide an exhaust gas turbine with an improved diffusor including means for mounting the shaft of the turbine wheel.

Further objects of our invention will appear from a detailed description of two preferred embodiments of our invention following hereinafter with reference to the accompanying drawings, it being understood that the terms and phrases used in such detailed description have been chosen for the purpose of illustrating the invention rather than that of restricting or limiting the same, the features of novelty being pointed out in the appended claims. In the drawings, Fig. 1 is an elevation of a ten-cylinder internal combustion engine equipped with the improved exhaust turbine, Fig. 2 is an end view of the engine shown in Fig. 1 viewed from the left with reference thereto, Fig. 3 is an axial section taken through an exhaust turbine similar to that shown in Figs. 1 and 2.

Fig. 4 is a development of the circumferential section taken along the broken line 4—4 of Fig. 3, Fig. 5 is an axial section similar to that of Fig. 3 of a modified gas turbine embodying the present invention, Fig. 6 is the cross section through the diffusor taken along the line 6—6 of Fig. 5, Fig. 7 is the section taken along the line 7—7 of Fig. 5, and Fig. 8 is the section taken along the line 8—8 of Fig. 6, the inner diffusor wall being omitted to expose the turbine shaft bearing to view.

The internal combustion engine 20 shown in Fig. 1 is equipped with ten cylinders arranged in a single row numbered from 1 to 10 from the left to the right, each cylinder being provided with an exhaust port 21. There are provided four exhaust manifolds 22, 23, 24 and 25. The exhaust manifold 22 constitutes a gas admission duct having three inlet ends connected to the exhaust ports 21 of the cylinders Nos. 8 9 and 10. The manifold 23 constitutes a gas admission duct having two inlet ends connected to the exhaust ports 21 of the cylinders Nos. 6 and 7. The manifold 24 constitutes a gas admission duct having two inlet ends connected to the exhaust ports 21 of the cylinders Nos. 4 and 5. The manifold 25 has three inlet ends communicating with the exhaust ports 21 of the cylinders Nos. 1, 2 and 3. Thus, it will appear that there is a plurality of gas admission ducts 22, 23, 24 and 25 having inlet ends connected to different cylinders of the engine to receive separate streams of exhaust gases therefrom. The outlet ends of these gas admission ducts communicate with peripheral ports of a housing 27 shown in Figs. 1, 2 and 3 which is formed by a pair of equidistant flaring sheet metal members 28 and 29 of circular cross section mounted in coaxial nested relationship.

The exhaust turbine furthermore comprises a stationary annular set of guiding vanes 26 mounted between the inner ends of the sheet metal members 28 and 29, as shown in Fig. 3. This stationary set is composed of four segmental groups I, II, III and IV indicated in Figures 1, 4, 5 and 6, each group being coordinated to one of the outlet ends of the gas admission ducts 22, 23, 24 and 25. For the purpose of such coordination the housing 27 is subdivided by radial partitions 30, 31, 32 and 33 (Figs. 1 and 4) into four segments I, II, III and IV. Hence, each segmental group of stationary vanes 26 will receive one of the four exhaust streams issuing from the four cylinder groups. A turbine wheel 34 is formed with rotary vanes 35 disposed in opposed relationship to the stationary vanes 26 to be impinged by the gas streams issuing therefrom. The turbine wheel is carried by a shaft 36 which may be used to operate a compressor 37 which serves to charge the cylinders Nos. 1 to 10 of the engine.

For the purpose of the present invention the turbine further comprises a plurality of separate diffuser ducts whose inlets are disposed adjacent to the turtbine wheel 34 to separately receive the streams issuing from the vanes 35 thereof. In the embodiment shown, these diffusor ducts are confined by a pair of coaxial walls 38 and 39 (Fig. 3) of circular cross section disposed in nested relationship and by substantially radial walls or partitions 40, 41, and 43 extending therebetween. The embodiment of the turbine illustrated in Figs. 1 and 2 differs from that shown in Fig. 3 by a reduction of the outer diameter of the wall 39 and by the provision of an external cylindrical housing 44 which is omitted in Fig. 3.

Preferably, the partitions 40 to 43 do not axially register with the partitions 30 to 33, but are slightly displaced relative thereto in circumferential direction, such displacement corresponding to a distance in the order of the circumferential travel of a gas molecule during the passage of the gas stream through the guiding vanes 26 and the rotary vanes 35. Hence, it will appear that each inlet end of a diffusor duct is so disposed relatively to one of the segmental groups I, II, III, IV of the stationary vanes as to receive but a single one of the gas streams. Moreover, it will appear that the diffusor ducts confined between the diverging walls 38 and 39 flare outwardly to thereby cause the gas streams to expand.

Preferably, the circumstantial dimensions of both the segmental groups I, II, III and IV and the associated diffusor ducts differ in proportion to the number of the associated cylinders. Thus, it will appear that the segmental groups I and IV each connected to three cylinders of the engine are larger than the segmental groups II and III each connected to a pair of cylinders only.

Owing to the provision of the partitions 40, 41, 42 and 43 the gas streams admitted to the turbine through the separate ducts 22, 23, 24 and 25 will be kept separated from each other upon passage through the turbine vanes and are thus prevented from adversely interfering with each other when the pressure and the consequent speed in one of the streams drops, while the pressure and the consequent speed in an adjacent stream increases. Therefore, the energy recovered in each diffusor duct will only depend on the instantaneous speed of flow prevailing in that duct irrespective of the instantaneous speed of flow prevailing in the adjacent ducts. Hence, diffusor ducts in which the instantaneous speed of flow is higher than that prevailing in the other ducts will also yield a higher proportion of energy. The static pressures of the gas streams entering the different diffusor ducts will be different, whereas the static pressures prevailing at the outlets of the diffusor ducts will be substantially the same. The displacement of the partitions 40 and 43 relative to the partitions 30 to 33 in circumferential direction promotes a clear coordination of the individual diffusor ducts to the different gas streams admitted to the turbine. It has been found that the speed and pressure conditions prevailing within each diffusor duct are substantially the same over the entire circumferential width of the duct. Flow variations may occur, however, around the gas entering edges of the radial partitions 40, 41, 42 and 43 because of the limited exchange of fluid between adjacent streams through the clearance between the turbine vanes and the entering edges that occur as a result of the different pressure and velocity conditions in each of the conduits at one and the same time. Such variations are liable to produce undesirable cross currents within the individual diffusor ducts which would interfere with the recovery of energy.

In order to avoid such interference the number of diffusor ducts may be increased above the number of the gas admission ducts. For this purpose, one or a plurality of transitional diffusor ducts may be provided within the transitional boundary regions between the main diffusor ducts registering with the different groups of vanes 26. Such an embodiment of the present invention is illustrated in Figs. 5 to 7 showing a gas turbine which is similar to that described hereinabove in that it is equipped with four gas admission ducts of which ducts 22 and 24 are illustrated in Figs. 5 and 7. These gas admission ducts communicate with circumferential ports of a housing 27 which, as described hereinabove, is formed by a pair of flaring sheet metal members 28 and 29 mounted in coaxial spaced relationship; such members holding between their inner ends a stationary annular set of guiding vanes 26 disposed in opposed relationship to a set of rotary vanes 35 carried by the turbine wheel 34 mounted on a shaft 36. The space between the members 28 and 29 is subdivided into four segmental spaces by radial partitions 30, 31, 32 and 33, each segmental space being coordinated to one segmental group of vanes 26. The diffusor ducts are confined between a pair of conical sheet metal members 138 and 139 mounted in nested coaxial relationship to each other and to the shaft 36 and by a plurality of radial partitions 140 to 151. Thus, it will be noted that each of the diffusor ducts thus formed is flaring from its inlet to its outlet to thereby recover the energy of the gas stream flowing therethrough.

The separate streams of exhaust gases entering the turbine are designated by I, II, III and IV, each of such streams issuing from one group of vanes 26. The diffusor, however, includes more than four ducts, to wit four main ducts I, II, III and IV and auxiliary ducts I', II', III' and IV'. These auxiliary ducts take up the gases issuing from the boundary zones of the segmental groups of vanes. In this manner, these gases are prevented from interfering with the streams in the main diffusor ducts I, II, III and IV. In other words, the additional partitions, such as 140 and 151, prevent the streams flowing through the auxiliary duct I' from adversely affecting the stream flowing through the duct I. Preferably, some of the radial partitions, such as 141, 144, 147 and 150, may be provided with means for mounting the bearing of the turbine shaft. As shown in Fig. 5, this bearing comprises a pair of anti-friction bearings 45 interposed between the shaft 36 and a surrounding bearing sleeve 46 which is coaxially mounted within the conical member 138. As will appear from Fig. 6, the radial partitions 141, 144, 147 and 150 have integral, inwardly directed extensions, such as 47, which are integral with and thus support the bearing sleeve 46. Alternatively, however, the radial walls or partitions 141, 144, 147 and 150 may be provided with longitudinal passageways 48 (Fig. 8), radial struts 49 extending therethrough into contact with the bearing sleeve 46 to carry the same. Preferably, the strut 49 is slightly spaced from the internal surface of the passageway 48 to reduce the transfer of heat to the strut 49 and through the latter to the bearing. In this event, the partitions are preferably streamlined in cross section, as shown in Fig. 8.

Moreover, the radial partitions, such as 141, 144, 147 and 150, may be provided with longitudinal ducts for the admission to the bearing of suitable operating media, such as a lubricant or a cooling medium, such as air or water. This is illustrated in Fig. 6 where the partitions 144 and 150 are each provided with a duct 50, or 51 respectively, for the admission of a lubricant to the anti-friction bearings 45.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. A turbine operable by the exhaust gases of an internal combustion engine comprising a plurality of gas admission ducts having inlet ends connected to different cylinders of said engine to receive separate streams of exhaust gases therefrom and having outlet ends, a stationary annular set of guiding vanes composed of a plurality of segmental groups of vanes, each segmental group being coordinated to one of said outlet ends to receive and direct one of said streams, a turbine wheel formed with rotary vanes disposed in opposed relationship to said stationary vanes to be impinged by said streams issuing therefrom, and a plurality of separate diffusor ducts having inlet ends disposed adjacent to said turbine wheel to separately receive said streams issuing therefrom, each of said inlet ends of said diffusor being so relatively disposed to one of said segmental groups of stationary vanes as to receive but a single one of said streams, said diffusor ducts flaring outwardly to cause said streams to expand.

2. A turbine as claimed in claim 1 in which said inlet ends of said diffusor ducts are circumferentially displaced with respect to said outlet ends a distance in the order of the circumferential travel of a gas molecule in said stream during its passage through said guiding vanes and said rotary vanes.

3. A turbine as claimed in claim 1 further comprising an additional set of auxiliary diffusor ducts interposed between said plurality of separate diffusor ducts and having inlet ends disposed adjacent to said turbine wheel.

4. A turbine as claimed in claim 3 in which said diffusor ducts are confined by a pair of coaxial walls of circular cross section disposed in spaced relationship and by substantially radial walls extending therebetween.

5. A turbine as claimed in claim 1 in which said diffusor ducts are confined by a pair of coaxial walls of circular cross section disposed in spaced relationship and by substantially radial walls extending therebetween, said turbine further comprising a shaft carrying said turbine wheel and a bearing carrying said shaft and being surrounded by said walls in coaxial relationship thereto, at least some of said radial walls being provided with means for mounting said bearing.

6. A turbine as claimed in claim 5 in which said means for mounting said bearing is constituted by substantially radial struts, at least some of said radial walls being provided with passageways through which said struts extend.

7. A turbine as claimed in claim 5 in which at least some of said radial walls are provided with passageways for the admission to said bearing of a lubricant.

References Cited in the file of this patent

UNITED STATES PATENTS

| | | |
|---|---|---|
| 1,180,403 | Leblanc | Apr. 25, 1916 |
| 2,603,945 | Brown | July 22, 1952 |
| 2,651,495 | Corbett | Sept. 8, 1953 |
| 2,692,724 | McLeod | Oct. 26, 1954 |
| 2,730,861 | Buchi | Jan. 17, 1956 |